US009940403B2

(12) United States Patent
Chow et al.

(10) Patent No.: US 9,940,403 B2
(45) Date of Patent: Apr. 10, 2018

(54) SYSTEM AND METHOD FOR MANAGING DEDICATED CACHES

(71) Applicant: MOBOPHILES, INC., Santa Monica, CA (US)

(72) Inventors: William W. Chow, Los Angeles, CA (US); Sairam Suresh, Los Angeles, CA (US); John Hyun, Temple City, CA (US); Mark Tsuie, Canoga Park, CA (US)

(73) Assignee: Mobophiles, Inc., Santa Monica, CA (US)

( * ) Notice: Subject to any disclaimer, the term of this patent is extended or adjusted under 35 U.S.C. 154(b) by 180 days.

(21) Appl. No.: 13/674,939

(22) Filed: Nov. 12, 2012

(65) Prior Publication Data
US 2013/0124667 A1 May 16, 2013

Related U.S. Application Data

(60) Provisional application No. 61/559,017, filed on Nov. 11, 2011.

(51) Int. Cl.
G06F 15/167 (2006.01)
G06F 17/30 (2006.01)
H04L 29/08 (2006.01)

(52) U.S. Cl.
CPC ...... *G06F 17/30902* (2013.01); *H04L 67/289* (2013.01); *H04L 67/2842* (2013.01)

(58) Field of Classification Search
CPC .................. G06F 17/30902; H04L 67/2842
(Continued)

(56) References Cited

U.S. PATENT DOCUMENTS

2001/0056500 A1* 12/2001 Farber ............... G06F 9/505 709/245
2002/0026563 A1* 2/2002 Chamberlain .... G06F 17/30902 711/138
(Continued)

FOREIGN PATENT DOCUMENTS

CA 2 415 641 A1 1/2002

OTHER PUBLICATIONS

International Search Report and Written Opinion dated Feb. 1, 2013 for International application No. PCT/US12/64735, 8 pages.
Partial Supplementary European Search Report for corresponding EP Application No. 12847114.1, dated Sep. 22, 2015 (6 sheets).
Extended European Search Report dated Jan. 19, 2016 for corresponding EP Application No. 12847114.1, (16 pages).
(Continued)

Primary Examiner — Dustin Nguyen
Assistant Examiner — Joel Mesa
(74) Attorney, Agent, or Firm — Lewis Roca Rothgerber Christie LLP

(57) ABSTRACT

A client-based computer system configured to communicate with a remote server through a network and to provide access to content or services provided by the server is provided. The system includes a processor, a storage device, a client-side cache dedicated to a set of resources specified by a configuration, and a caching manager to automatically manage the cache as directed by the configuration. The client-side cache is directed by the configuration to transparently intercept a request for one of the resources from a client application to the server, and to automatically determine when to send the request to and provide a response from the server over the network to appear to the client application as though the client application sent the request to and received the response from the server.

37 Claims, 11 Drawing Sheets

(58) Field of Classification Search
USPC .................................................. 709/213, 214
See application file for complete search history.

(56) References Cited

U.S. PATENT DOCUMENTS

| | | |
|---|---|---|
| 2002/0116517 A1 | 8/2002 | Hudson et al. |
| 2004/0044731 A1 | 3/2004 | Chen et al. |
| 2005/0086292 A1* | 4/2005 | Yee .......................... G06F 8/00 709/203 |
| 2005/0097166 A1* | 5/2005 | Patrick .................... H04L 63/20 709/203 |
| 2006/0031833 A1* | 2/2006 | Huang .................. G06F 9/4425 717/178 |
| 2008/0228899 A1 | 9/2008 | Plamondon |
| 2010/0138485 A1* | 6/2010 | Chow ............... G06F 17/30902 709/203 |

OTHER PUBLICATIONS

SIPO Office Action dated Feb. 2, 2016 for corresponding Chinese Patent application 201280055543.2, with English Translation (24 pages).

Australian Office action dated Mar. 24, 2016 for corresponding Australian Patent application 2012334941, (3 pages).

Chinese Office Action dated Jul. 10, 2017 for corresponding Chinese application No. 201280055543.2, and English Translation (29 pages).

* cited by examiner

SYSTEM AND METHOD FOR MANAGING DEDICATED CACHES

CROSS-REFERENCE TO RELATED APPLICATIONS

This utility patent application claims the priority to and the benefit of U.S. Provisional Patent Application Ser. No. 61/559,017, filed Nov. 11, 2011, entitled SYSTEM AND METHOD FOR MANAGING DEDICATED CACHES (hereinafter "the Priority Document"), which is related to U.S. patent application Ser. No. 12/630,806, filed Dec. 3, 2009, entitled SYSTEM AND METHOD FOR PROVIDING VIRTUAL WEB ACCESS (hereinafter "U.S. Ser. No. 12/630,806"), which claims priority to and the benefit of U.S. Provisional Application Ser. No. 61/119,377, entitled "SYSTEM AND METHOD FOR PROVIDING VIRTUAL WEB ACCESS," filed on Dec. 3, 2008, the entire contents of all of which are incorporated herein by reference.

BACKGROUND

1. Field

Aspects of embodiments of the present invention are directed toward cache management, such as web caching.

2. Description of Related Art

Current client-server systems, such as web applications, can leverage caching at various points to optimize performance, such as at the end user computer or somewhere in the network. These web caching solutions generally provide for a shared cache in which content from multiple users and/or sites share the same space on disk and/or in memory to store content for faster retrieval on subsequent access. A shared cache results in competition for the same limited cache space between content accessed across different sites and/or by different users.

These web caching solutions also do not provide for a way to centrally customize caching behavior based on the application. For example, a large company may have multiple servers running a particular web application, such as separate ones for different departments or business units. These approaches may target specific domains and/or URLs, so they are unable to apply caching policies based on an application type.

SUMMARY

Aspects of embodiments of the present invention address these and other concerns by providing for centrally managed cache control. In further detail, aspects of embodiments of the present invention provide for fine-grain control (via, for example, uniform resource locator (URL) pattern) of what is or is not cached or purged per user (or per user account). Further aspects allow for enabling or disabling seamlessly without secure sockets layer (SSL), domain name system (DNS), or networking changes. Still further aspects provide for allocating space per domain or URL pattern. Additional aspects provide for application-specific control, adjusting of caching of read or write operations, and automatically configuring (for example, auto-mobolizing) via URL templates.

In addition, aspects of embodiments of the present invention provide for central controlling of endpoint-specific web capabilities. In further detail, aspects provide for adjusting synchronize (sync) activity, adding support for form-based authentication, enabling or disabling of offline access, configuring of unique identifier (UI) elements, and measuring or reporting on actual end user experience Accordingly, embodiments of the present invention provide for the management of dedicated caches, each of which can be assigned, for example, to the caching of content associated with a particular URL pattern (e.g., for specific servers/sites, subpaths/folders, or files/objects). These dedicated caches may be remote from the management system (and in that sense be referred to as remote dedicated caches, i.e., with respect to the management system), such as when the caches reside at an end user computer or an intermediate caching server between a client system communicating with one or more server systems.

The related patent application, (U.S. patent application Ser. No. 12/630,806 (hereinafter "U.S. Ser. No. 12/630,806"), describes how one or more URLs are associated with a server account or application, for the purposes of caching server responses for client requests that are within the scope of that URL. U.S. Ser. No. 12/630,806 describes various aspects of caching a server account that significantly improves its manageability, such as specifying a custom storage limit for that server account's cache and/or customizing what is stored in that server account's cache. By supporting a custom storage limit for each server account, U.S. Ser. No. 12/630,806 provides for features such as dedicating a private cache space for the server account, such that this cache space is specifically dedicated to the caching of the URL patterns associated with the server account, where the pattern can be a site, subpath/folder, or specific file/object.

A resulting benefit of a dedicated cache per server account is that the dedicated caches do not share cache space with the content for other sites/folders/files, and thus are not subject to the typical cache competition resulting from sharing a common cache space, such as the shared caches provided by browsers or proxy servers. The cache competition for these shared caches is normally higher than that of for a dedicated cache. Accordingly, by creating one or more dedicated caches, with each one associated with one or more URL patterns, these dedicated caches can help ensure longer cache lifetimes and higher cache hit rates than a shared cache. This, in turn, may provide for benefits such as faster web performance, less bandwidth used, fewer requests/roundtrips performed, and lower overall load on the server-side infrastructure.

The present invention improves upon the dedicated caching of U.S. Ser. No. 12/630,806 by providing fine-grain management and control of these caches. Providing fine-grain control of what is cached and how it is cached may improve performance and reduce infrastructure load, such as by matching multiple related requests/URLs to the same cache content or extending the cacheable lifetime of content beyond that specified by the server.

Centralized management of these dedicated caches can provide for a wide variety of actions that can be taken by an administrator to remotely control a large number of these dedicated caches. For example, these actions may include dynamically creating/deleting these dedicated caches, adjusting the space they are each allocated, and setting/changing the caching policies applied to each one.

In an exemplary embodiment of the present invention, a client-based computer system configured to communicate with a remote server through a network and to provide access to content or services provided by the server is provided. The system includes a processor, a storage device, a client-side cache dedicated to a set of resources specified by a configuration, and a caching manager to automatically manage the cache as directed by the configuration. The client-side cache is directed by the configuration: to transparently intercept a request for one of the resources from a client application to the server; and to automatically determine when to send the request to and provide a response from the server over the network to appear to the client application as though the client application sent the request to and received the response from the server. The client-side cache does this: by sending the request to the server to appear to the server as though the client application sent the request, providing the response from the server, and storing the response on the storage device; or by providing the response from the cache.

In another exemplary embodiment of the present invention, a method for configuring a computer to communicate with a remote server through a network and to provide access to content or services provided by the server is provided. The method includes: creating one or more dedicated caches, each cache being associated with one or more URLs; for each cache, managing the cache according to one or more rules; transparently intercepting a request for one of the URLs from a client application to the server; and automatically determining when to send the request to and provide a response from the server over the network to appear to the client application as though the client application sent the request to and received the response from the server. The providing a response includes: sending the request to the server to appear to the server as though the client application sent the request, providing the response from the server, and storing the response on a storage device; or providing the response from one of the caches.

BRIEF DESCRIPTION OF THE DRAWINGS

The accompanying drawings illustrate embodiments of the present invention, and together with the description, serve to explain principles and aspects of the present invention.

DETAILED DESCRIPTION

Figure 1:
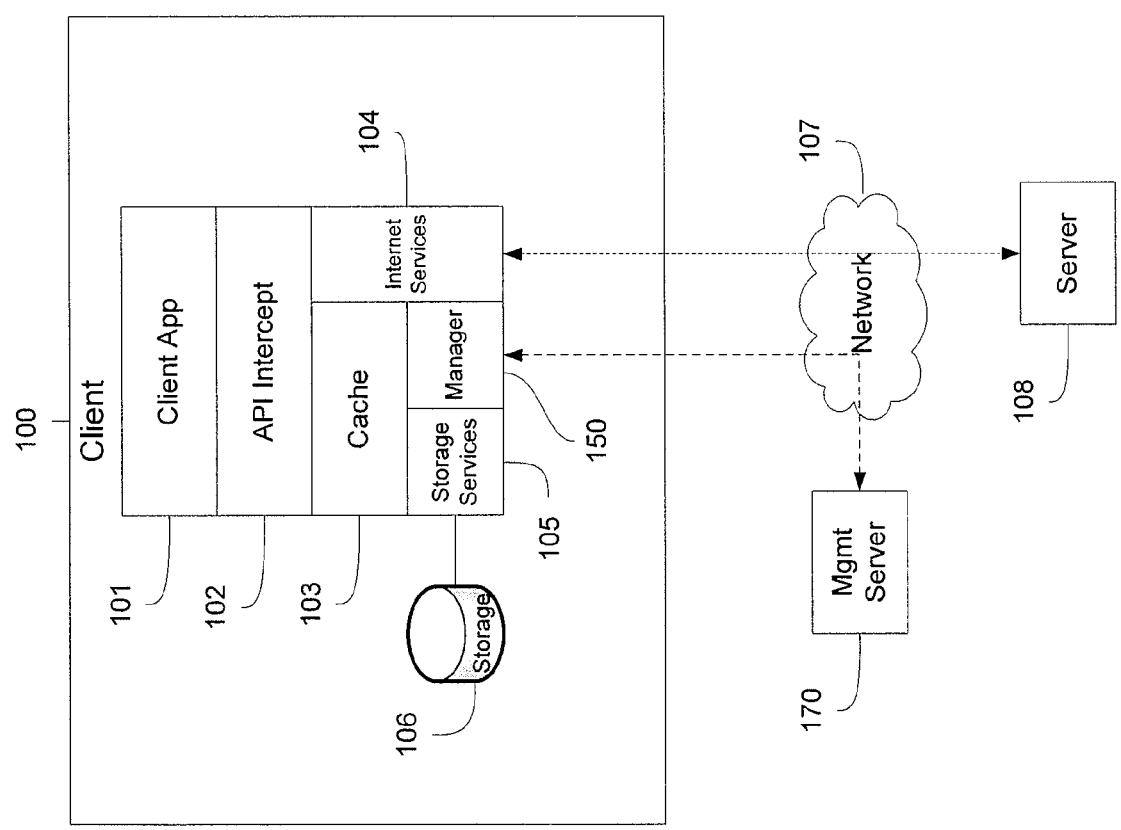
FIG. 1 is a diagram showing a system architecture of centrally managed dedicated caches, where the caches are resident on a client computer accessing application/data on a remote server, according to an exemplary embodiment of the present invention.

The illustrative embodiments that follow are only exemplary applications of the present invention and not intended to limit the scope of the invention. An appendix is provided in the Priority Document that contains more implementation-specific details of exemplary embodiments of the present application.

1 Managing Dedicated Caches

Embodiments of the present invention provide for dedicated caches, where each cache is dedicated to storing the content for one or more uniform resource locator (URL) patterns. These dedicated caches are each associated with a server account, where a server account is associated with one or more URLs for the purposes of caching server responses, as described by the related patent application U.S. Ser. No. 12/630,806. Embodiments of the present invention provide for a significant improvement over the prior art by enabling the customization of each dedicated cache, such as specifying what content is cached and how it is cached.

Embodiments of the present invention provide for fine-grain cache control via configuration settings that can be dynamically customized, such as by an end user, system administrator, or web site developer. These configuration settings can be stored in a number of different methods known to a person having ordinary skill in the art, such as in a file or database. An exemplary embodiment of the present invention supports these configuration settings in a text file according to the YAML specification (http://www.yaml.org/), which allows for a simple extensible structure that can be directly edited by a user with any standard text editor.

1.1 Application-Based Configurations

Embodiments of the present invention can assign different caching rules/policies/behaviors for each cache, such that each cache can be customized to support different capabilities for each web site/application, since each web site/application can have very different behaviors that affect how they may be cached. By supporting a flexible way to define customized configurations for each web application, embodiments of the present invention may be adapted to support any current and future web application.

Embodiments of the present invention may also automatically create caches based upon a URL template. For example, it may be desirable to automatically create caches for any server within an internet domain, such as for acme.com, without knowing all of the possible server names in advance, such as server1.acme.com or server99.acme.com. A URL template allows the system to automatically create caches based upon a string-based pattern that is used to match the URL for content accessed from a remote server. For example, a URL template specified as "http://*.acme.com" would allow the client system to automatically create separate caches for content from any server in the acme.com domain, without needing to specify each of them explicitly.

Embodiments of the present invention may apply one or more configurations to a cache in a number of different ways, such as by assigning each configuration a URL pattern and applying the configuration to the caches of any server account with a matching URL. A configuration can also be assigned some other identifying information that can be obtained from the server, such as in the "Server" header of an HTTP response or perhaps even a custom header returned from the server.

An exemplary embodiment of the present invention matches configurations to a cache by supporting the following attributes, which can be assigned to each configuration:

| Attribute | Format/Syntax | Description |
|---|---|---|
| mode | "header" or "url" | The type of server information to use for matching this configuration |
| url | Regular expression string | If mode = url, this attribute is used to match against the URLs associated with a cache. |
| name | Regular expression string | If mode = header, this attribute is used to identify the server response header containing the information to use for matching. |
| value | Regular expression strings | If mode = header, this attribute is matched against the value of the header specified by the "name" attribute. |

The following is an example of the attributes to associate a configuration based on URL:

```
id:
    mode: domain
    url: 'http[s]://maps\.google\.com/.*'
```

Likewise, the following is an example of the attributes to associate a configuration based on a custom hypertext transfer protocol (HTTP) response header:

```
id:
    mode: header
    name: MicrosoftSharePointTeamServices
    value: '12\.0\.0\.[0-9]+'
```

1.2 Matching Requests and Responses

According to one exemplary embodiment, an application configuration setting includes two sets of possible attributes:
  Matching attributes: specifies which requests/response to which application configuration setting applies.
  Action attributes: specifies the actions/behaviors for the application configuration setting.

The matching attributes can match against one or more components of the client/server request or response, such as the request's URL or the response's body. An exemplary embodiment of the present invention provides for the following matching attributes:

| Attribute | Format/Syntax | Description |
|---|---|---|
| subPath | Regular expression string | Compare against the request URL |
| Headers | Array of regular expression strings | Compare against the request headers |
| Body | Regular expression string | Compare against the request body |
| notSubPathPatterns | Array of regular expression strings | Negatively compare against the request URL |
| notBodyPatterns | Array of regular expression strings | Negatively compare against the request body |
| Responses | Array of response structures | Compare against the body of the response received for a matching request. |

Once a configuration setting is found to match a request or response, based on the matching attributes, then the action attributes can be correspondingly applied to the request/response.

1.3 Configuration Actions

According to an exemplary embodiment, there are a number of different action attributes that can be associated with an application configuration setting, where any combination of one or more actions can be specified to change the default behavior of the cache. This provides the ability to customize the behavior and operation of the dedicated cache for each server account, such as to support different types of web site/applications or to override/optimize the cacheability of the web application beyond the default.

1.3.1 Remapping Requests

There may be cases where different requests, each with a different URL, actually correspond to the same response data. For example, it is common for web developers to leverage the URL to carry transient data, such as the URL of the previous page or perhaps a session identifier. In these cases where these seemingly different requests would actually result in the same response from the server, it would be advantageous to treat them as being the same request so that they can all be serviced from the same-cached version of the response.

To support remapping different variations of the same request to the same response, an exemplary embodiment of the present invention filters out the portions of the request that are different between similar instances of the same underlying request, such as removing transient data specified as a URL query string argument, so that these different request variations ultimately look the same. The following table lists example action attributes of a configuration setting for filtering out portions of an HTTP request:

| Attribute | Format/Syntax | Description |
|---|---|---|
| filterUrlPatterns | Array of regular expression strings | Substrings within the URL of the request to filter out. |
| filterHeaderPatterns | Array of regular expression strings | Substrings within the headers of the request to filter out. |

-continued

| Attribute | Format/Syntax | Description |
| --- | --- | --- |
| filterBodyPatterns | Array of regular expression strings | Substrings within the body of the request to filter out. |

Using these action attributes, the following is an example of a configuration setting for filtering out the query string argument from the request URL specifying the previous page:

```
cache:
    gets:
        -   subPath: '.*\?retURL=.+'
            filterUrlPatterns:
                - '[\?&]retURL=[^&]+'
```

In a similar fashion, the following is another, more complex, example of a configuration setting for remapping variations of a request for the same web page (SharePoint site) to the same cache, by filtering out the transient components of the request:

```
cache:
    posts:
        -   subPath: '.*/AllItems\.aspx.*'
            notBodyPatterns:
                - '.*&ctl.*%24btnWikiSave=Apply&.*'
            filterUrlPatterns:
                - '(?i)[\?&]source=[^&]*'
                - '(?i)[\?&]contenttypeid=[^&]*'
                - '(?i)[\?&]initialtabid=[^&]*'
                - '(?i)[\?&]visibilitycontext=[^&]*'
                - '(?i)[\?&]isdlg=[^&]*'
                - '(?i)[\?&]viewcount=[^&]*'
```

1.3.2 Controlling Cache Lifetimes

There are cases where it may be desirable to control or change the lifetime of a cached response, such as when the server is not properly configured to enable caching or when the user may prefer to override the cache lifetime specified by the server. For example, there is often static content on a server that is cacheable (e.g., images, javascript, cascading style sheets, PDFs, etc) but some of it may not be properly configured to be optimally cached at the client.

To control the lifetimes of items stored in a dedicated cache management system according to an exemplary embodiment of the present invention, the system applies a validity period to server responses that would take precedence over the validity period, if any, provided by the server. The following table lists example action attributes of a configuration setting that control how the server response is cached:

| Attribute | Format/Syntax | Description |
| --- | --- | --- |
| maxAge | Integer | Set a validity period for the cached content, overriding any validity period specified by the server. Possible values:<br>0: Treat as expired, check server for validity<br>>0: Valid for the specified # of seconds beyond the "Date" header specified in the response |

Using these action attributes, the following is an example of a configuration setting to specify a cache validity period of 1 year (31,536,000 seconds) for requests from the "_layouts" folder:

```
cache:
    gets:
        -   subPath: '.*/_layouts/.*'
            maxAge: 31536000
```

2 Centralized Management

Embodiments of the present invention provide for a centralized management capability for remote dedicated caches by providing a management server that presents a management console for administrators to centrally configure the operation and behavior of these caches. In an exemplary embodiment, the management console operates out-of-band from the normal client-server interaction of the applications/sites being cached.

FIG. 1 is a diagram showing an exemplary embodiment of the centrally managed dedicated caches (such as Cache 103), where the caches are resident on a client computer (such as Client 100) accessing application/data on a remote server (such as Server 108).

Referring to FIG. 1, the Client 100 is a computer that supports communications with the Server 108 through Network 107 (such as the Internet). The Client 100 supports the operation of a Client Application (Client App) 101, which may be, for example, any Internet-based client application that can communicate with a remote server, such as a web browser. The Client 100 may contain a central processing unit (CPU) or processor for executing software in the form of computer instructions, nonvolatile storage (such as a disk drive) for storing the software and associated data accessed or generated by the CPU, and a network interface (such as Internet Services 104) for accessing the Network 107.

In further detail, application programming interface (API) Intercept 102 has been injected between the Client App 101 and Internet Services 104, allowing the API Intercept 102 to direct requests from the Client App 101 to the Server 108 (via Internet Services 104), Cache 103, or any combination of the two. Requests directed to the Cache 103 may be handled using responses stored locally on Storage 106 (for example, a nonvolatile storage device, such as a disk drive). Access to the Storage 106 may be handled through Storage Services 105, which is a common storage access layer, such as a file system, database, or a combination thereof.

In addition, Manager 150 manages the functions and operation of the Cache 103, and interacts with Management Server 170 (for example, a remote server to manage local dedicated caches, such as the Cache 103) to dynamically receive and process configuration changes and actions. In this case, "local dedicated caches" refers to the dedicated caches being stored on a storage device that is local to the client computer system.

Figure 2:
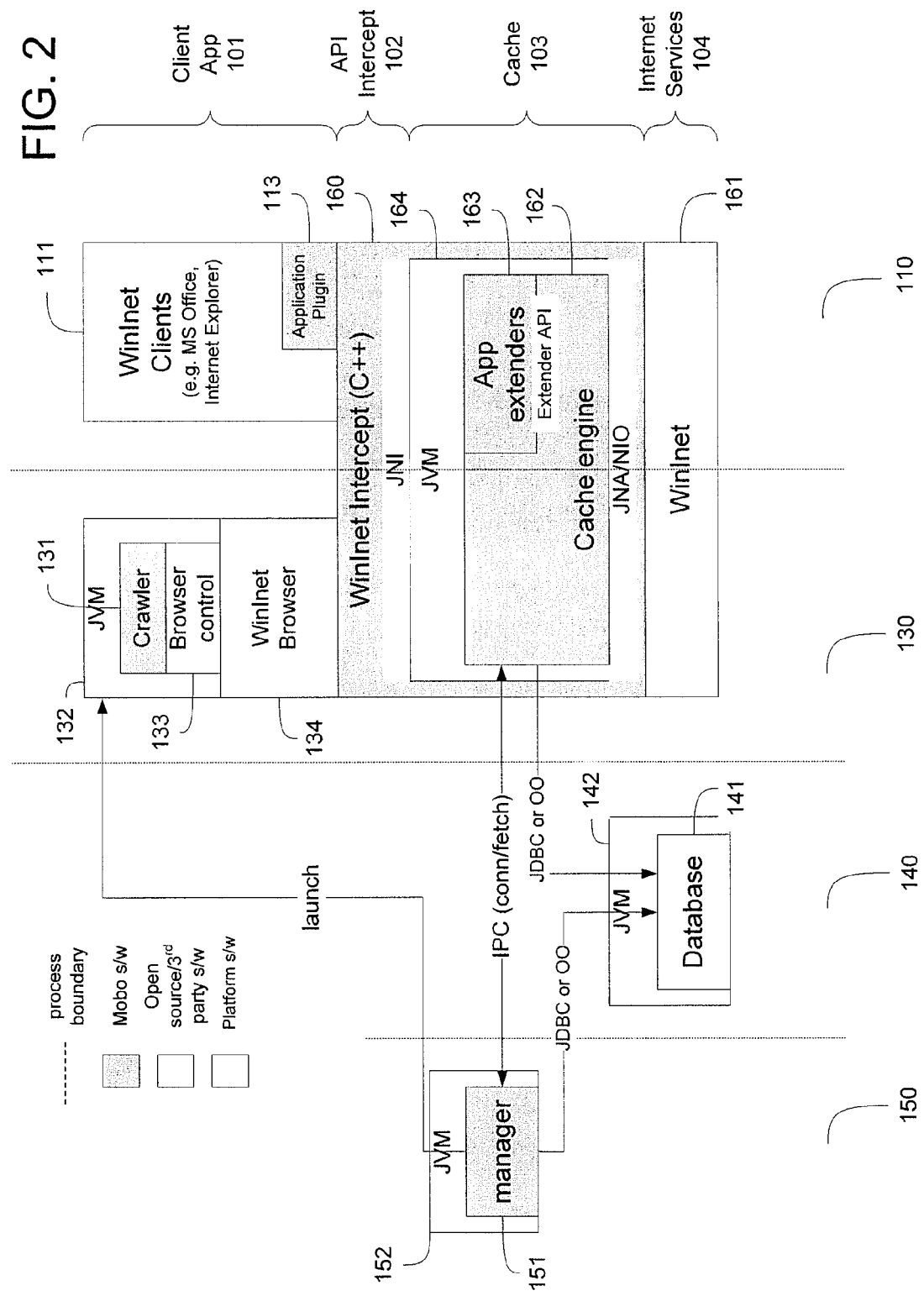
FIG. 2 is a diagram showing an example set of client processes according to an exemplary embodiment of the present invention.

FIG. 2 is a software architecture diagram showing an embodiment of the client processes in an example system. This figure shows the software components that are most relevant to this embodiment, and it is understood by someone of ordinary skill that there are other software components that are not shown. There are four logically distinct processes shown, numbered as 110, 130, 140, and 150. For processes 110 and 130, software layers from FIG. 1 (e.g., Client App 101, API Intercept 102, Cache 103, and Internet Services 104) are shown, indicating how they map to the specific instances within this diagram.

Process 110 is running WinInet Client 111, such as Microsoft Word or Microsoft Internet Explorer, which is a type of Client App 101 that normally links to Microsoft's WinInet dynamic-link library (DLL), which is a type of Internet Services 104. WinInet Intercept 160 is an example API Intercept 102 that intercepts requests by WinInet Client 111, which allows WinInet Intercept to redirect requests intended for WinInet 161 to Cache 103 instead. WinInet Client 111 loads Application Plugin 113, which can be implemented as a COM Office addin for Microsoft Word or a browser helper object (BHO) for Microsoft Internet Explorer. The application plugin can provide access to the Cache 103 from the client user interface, such as getting or setting cache contents or status. The application plugin can also serve to inject WinInet Intercept 160 to enable interception of function calls between WinInet Client 111 and WinInet 161. This allows the Cache 103 to receive and handle Internet requests issued from WinInet Client 111.

The embodiment applies to any Client App 101 that accesses an Internet Services 104, such as Mozilla Firefox, which uses Mozilla Netlib for its Internet services. Any application that accesses the Internet via the API of an Internet Services 104 can be intercepted by an API Intercept 102, which can then redirect its Internet requests to the Cache 103. A Client App 101 that accesses a different Internet Services 104 may use a different API Intercept 102 to enable interception.

The Cache 103 may, for example, be common across applications, such as in Processes 110 and 130. The Cache 103 may include Cache Engine 162, which in turn may include one or more software components providing application-generic functionality. The Cache 103 may also include zero or more App Extenders 163, which logically extends the Cache Engine 162 with application-specific functionality. In some embodiments, the Cache Engine 162 may be Java software running inside Java Virtual Machine 164 (JVM), which enhances portability across different computing platforms. When the Cache Engine 162 receives an Internet request, the Cache Engine 162 may query the response data from storage, such as via Database 141, which may be accessed via a separate Process 140. The Cache Engine 162 may also call App Extender 163 to assist with the request. If a valid response is found, the Cache Engine 162 returns the response to the upper layer Client App 101, such as WinInet Client 111 in Process 110. Otherwise, the Cache Engine 162 may cause the request to be issued to the server, which may take place through another context, such as via Crawler Process 130.

While the Cache 103 runs on the client computer in the embodiment of FIG. 2, the Cache 103 may also run on one or more separate computing systems, such as one with better availability or more bandwidth to the client computer than that of the server. For example, the Cache 103 may run on another platform (e.g., server, phone, etc.) on the same or nearby local area network (e.g., Ethernet, WiFi, Bluetooth), thus allowing the Cache 103 to provide improved availability and/or performance characteristics to the web application.

An aspect of the invention according to some embodiments is to support application-specific customization, through the support of 3rd-party software. There are a number of direct and indirect ways that external software can assist with request handling. For example, direct calls to application-specific software can be supported through external functions that were linked with the Cache Engine 162. As another example, indirect calls with application-specific software can be supported through inter-process communications, such as message queues or pipes that are opened by the Cache Engine 162. The calls to external software may be conditional, such as qualified based on the request parameters. For example, calls to external software can be set by configuration parameters on the Cache Engine 162, such as configuration parameters that specify patterns to match against the request headers before a particular call is performed.

Process 130 is running a crawler 131, which supports communications with the servers, often in the background (i.e., not visible to the user). The crawler may be a Java software component running inside JVM 132, which may be the same JVM instance as JVM 164. The crawler 131 requests server resources by programmatically controlling an Internet-based Client App 101, such as a WinInet Browser 134, which may be the same or similar to WinInet Client 111. WinInet Browser 134 can be controlled programmatically through a Browser Control layer 133, such as Web Application Testing in Java (Watij) or TeamDev JExplorer. Also similar to Process 110, Process 130 injects WinINet Intercept 160 (e.g., Crawler 131 calls LoadLibrary via Java native interface (JNI)) to enable the interception of Internet requests from WinInet Browser 134.

Process 130 may differ from Process 110 in that Internet requests to the Cache 103 are transmitted to the server, such as when a cached version is missing or needs to be refreshed; these requests are passed by WinInet Intercept 160 through to WinInet 161 so that they may be handled by the server. The Cache 103 may support this behavior by providing a different operational mode (than that of Process 110), which may be explicitly requested by Crawler 131, such as through a call made during initialization time. Any new response data received from the server may be stored to the Database 141, so that it may be persisted and made accessible, such as by Process 110.

Some embodiments may access storage through the Database 141, which may consist of a file system, database, or combination thereof. The Database 141 may be accessed within the same process as that of the Cache 103, or it may be provided by a separate context or process, such as Process 140. In some embodiments, Process 140 is running the Database 141, which manages access to the locally cached server content. The Database 141 may be a Java software component running inside JVM 142. Other processes may retrieve or store data from the database by communicating with Process 140 using common inter-process communications (IPC) mechanisms, such as Java remote method invocation (RMI) or Java database connectivity (JDBC). The Database 141 may also run within a Client Process, such as within Processes 110 or 130; for example, this may be the case if the Database 141 supports inter-process serialization of shared data.

Process 150 is running a Manager 151, which handles miscellaneous control and management tasks, such as launching crawlers and watching for changes in server connectivity. Manager 151 may be a Java software component running inside JVM 152. Other processes may access the services provided by manager 151 by using common IPC mechanisms, such as Java RMI.

3 Client/Server Interaction

3.1 Client Registration

In an exemplary embodiment of the present invention, such as the embodiment of FIG. 1, each remote cache (i.e., with respect to a central manager) is logically associated with a particular configuration maintained at the Management Server 170, so that the remote cache can be preconfigured at installation time or subsequently reconfigured. In an exemplary embodiment, the remote cache (such as the Cache 103) is resident on a client computer, such as the Client 100, and the Client 100 would register with the Management Server 170 to initially obtain its configuration data and then periodically check for configuration changes. Every client is associated with a particular configuration group, and each configuration group would have a unique identifier (UI), called the Owner globally unique identifier (GUID), that can be assigned to each Client 100.

The assignment of the Owner GUID to Client 100 can be performed in any number of ways. In one exemplary embodiment, the software installation package for the Client 100 can contain the Owner GUID as a property embedded within, such that it is later available to the Client 100. In this case, there would be a different installation package for each group, and each of these installation packages can be uniquely identified via different URLs. Alternatives for assigning the Owner GUID can include, for example, allowing user to pick the configuration group before or after installing the Client 100, or allowing the Management Server 170 to assign an Owner GUID based on some information about the client, such as its IP address, computer name, or username of the current user.

Figure 3:
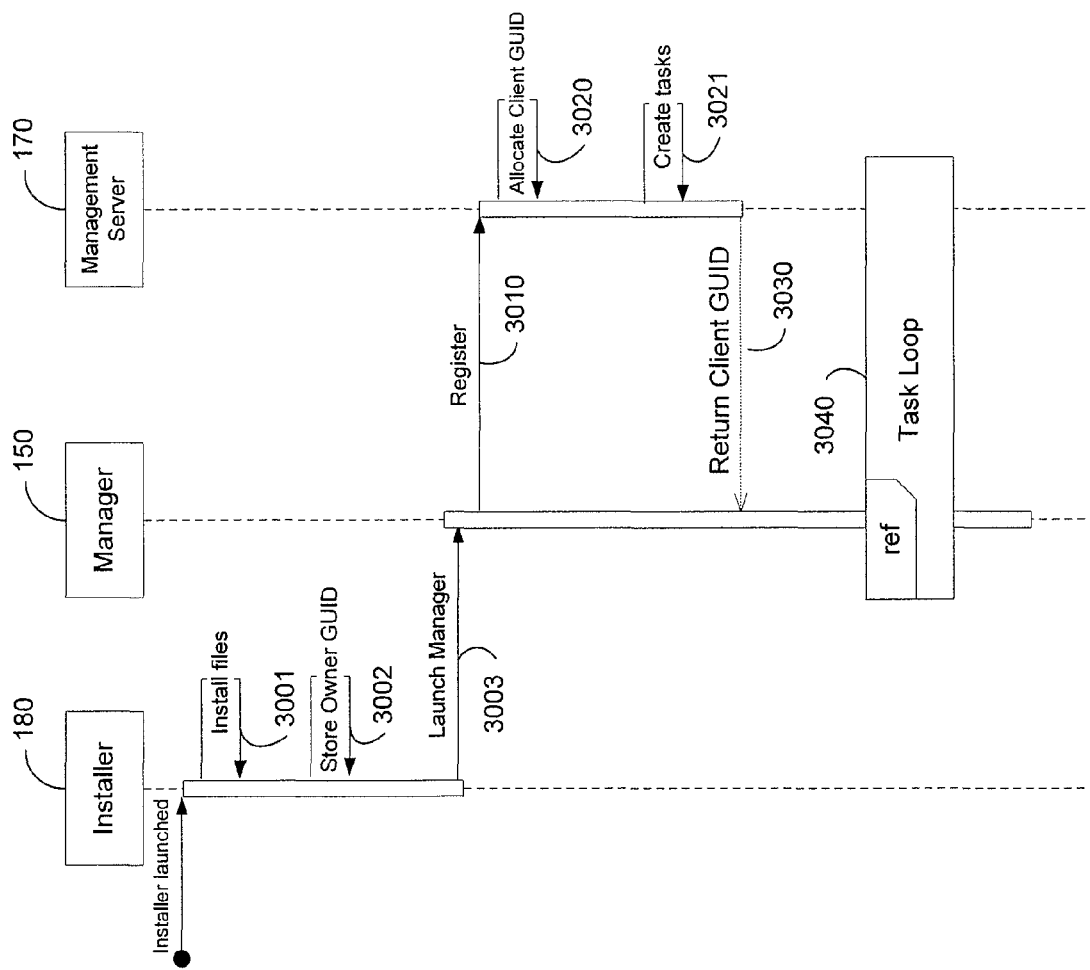
FIG. 3 is a Unified Modeling Language (UML) sequence diagram showing an example registration process for registering a client computer with a management server according to an embodiment.

FIG. 3 shows a Unified Modeling Language (UML) sequence of an exemplary embodiment for registering Client 100 with Management Server 170. When Installer 180 is launched, the Installer 180 will perform Install Files 3001 and other common installation tasks, as well as perform Store Owner GUID 3002. When Installer 180 is finished, its last task is to start up Manager 150 (e.g., a caching manager) by performing Launch Manager 3003.

Manager 150 handles the client-side cache management functions, including retrieving, applying, and updating configurations and settings for the Cache 103. The first time Manager 150 is run, it performs step Register 3010 to perform its initial registration with the Management Server 170. Whenever a new Client 100 registers with the Management Server 170, the Management Server 170 performs step Allocate Client GUID 3020, which assigns a unique identifier for that client for its subsequent interactions with the Management Server 170. The Management Server 170 also performs step Create Tasks 3021 to create any initial tasks associated with the new Client 100. Management Server 170 will return the new Client GUID at step 3030 to the new Client 100, possibly along with any initial tasks for the new client, such as a new configuration or license task.

In one exemplary embodiment, after the Manager 150 has registered once, it subsequently checks with the Management Server 170 on a periodic basis for any new tasks that can be generated as the result of any configuration changes made, for example, by an administrator on Management Server 170, as described in UML frame Task Loop 3040, which is described further with reference to FIG. 4 below.

3.2 MMC Tasks

Figure 4:
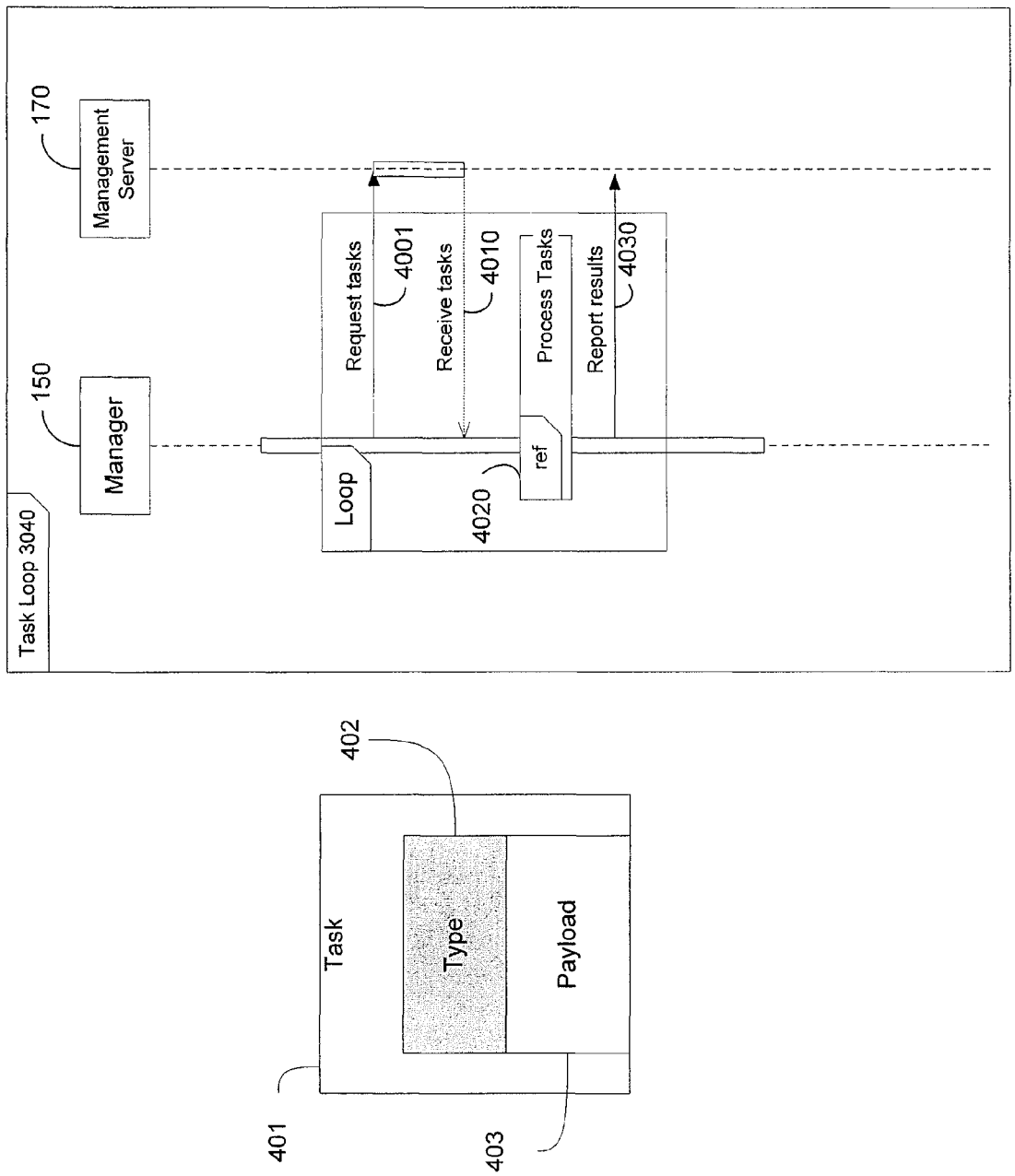
FIG. 4 is a UML sequence diagram showing an exemplary management task loop according to an embodiment.

FIG. 4 is an UML sequence diagram showing an exemplary UML frame Task Loop 3040 according to an embodiment of the present invention.

Referring to FIG. 4, UML frame Task Loop 3040 illustrates the general processing of tasks that the Manager 150 may receive from the Management Server 170. On a periodic basis (such as every five seconds), the Manager 150 checks for any new tasks at step Request Tasks 4001, which can be generated as the result of any configuration changes made by an administrator on the Management Server 170. If any tasks are returned via step Receive Tasks 4010, they can be applied at step Process Tasks 4020. The results of the tasks performed are reported back to the Management Server 170 via step Report results 4030.

FIG. 4 also shows a generalized Task 401, sent by the Management Server 170 to the Manager 150 during step Receive Tasks 4010. It is defined by a Type 402, and optional Payload 403. The Type 402 and Payload 403 of a task 401 vary and may be represented in a variety of encodings, including character strings, binary data, and the like. In Process Tasks 4020, one or more tasks may be processed, each of which may be of a different type. The processing of each specific task is described below as individual variations of Process Tasks 4020. After all tasks have been processed, the Manager 150 performs Report Results 4030 to send their results to the Management Server 170.

Figure 5:
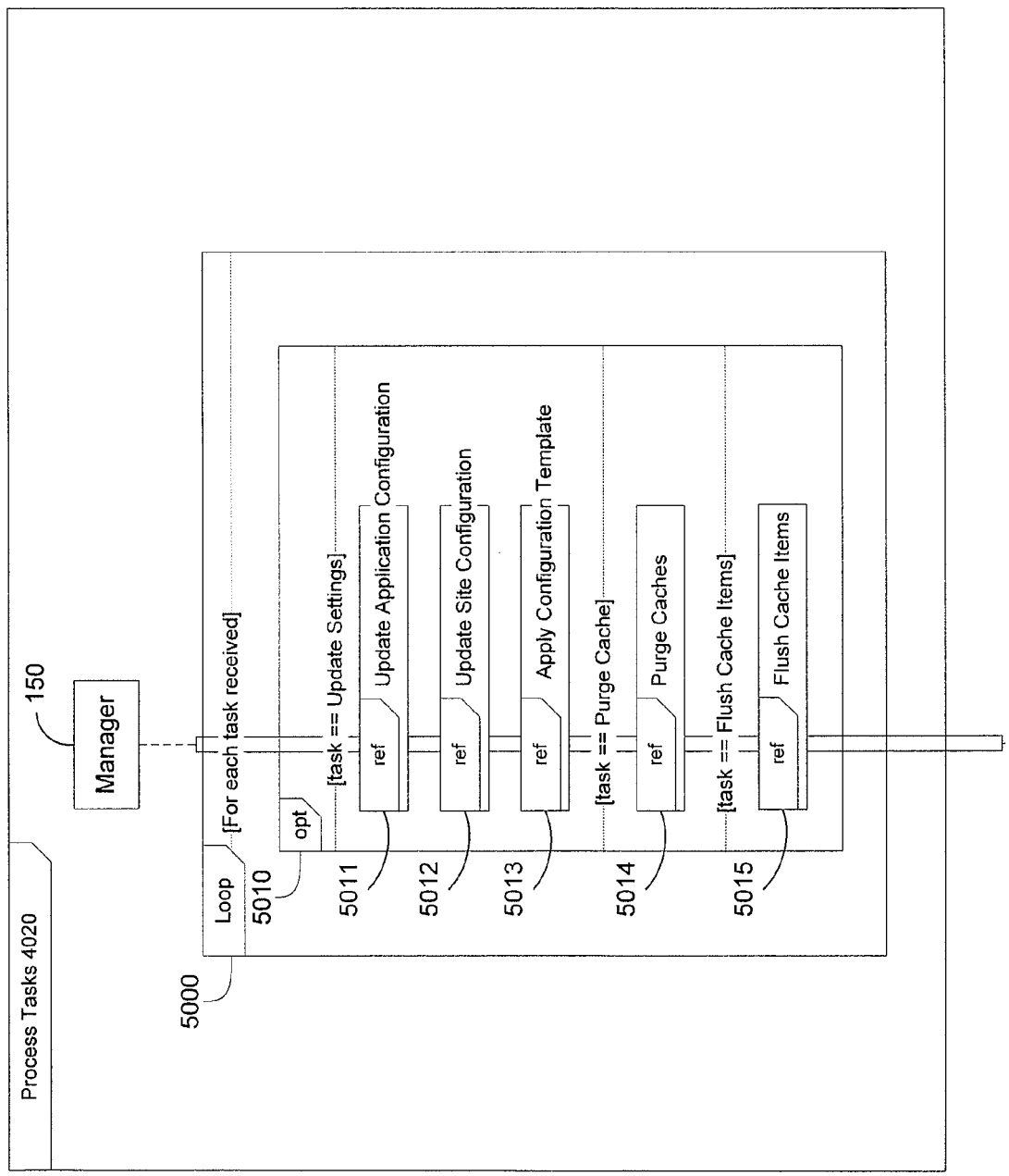
FIG. 5 is a UML sequence diagram showing an exemplary processing of tasks by the manager as received from the management server according to an embodiment.

FIG. 5 details a UML sequence of an exemplary embodiment for the general processing of tasks by the Manager 150 as received from the Management Server 170. One or more tasks can be received in each iteration of Task Loop 3040, and these tasks are processed by the Manager 150 in Loop 5000. Each of the tasks is processed in step 5010, based upon the type of the task, as determined by the Task Type 402.

3.2.1 Update Settings Task

For example, with continuing reference to FIG. 5, if the Manager 150 receives a task 401 with the Task Type 402 set to "Update Settings", then Payload 403 can contain multiple subtasks that need to be performed at Client 100, such as updating application configuration data (step 5011), site configuration data (step 5012), or configuration template settings (step 5013), which are described in further detail with reference to FIGS. 6-8, respectively, below.

If the Update Settings task payload indicates that application configuration needs to be updated, then it is updated at step 5011. Application configuration data can provide fine-grain control or complex operational parameters for the Client 100, such as for controlling the operation of the Cache 103 and/or Manager 150. For example, application configuration data can specify application-specific behavior for the Cache 103, such as which HTTP requests are cached or how specific URLs are cached.

Figure 6:
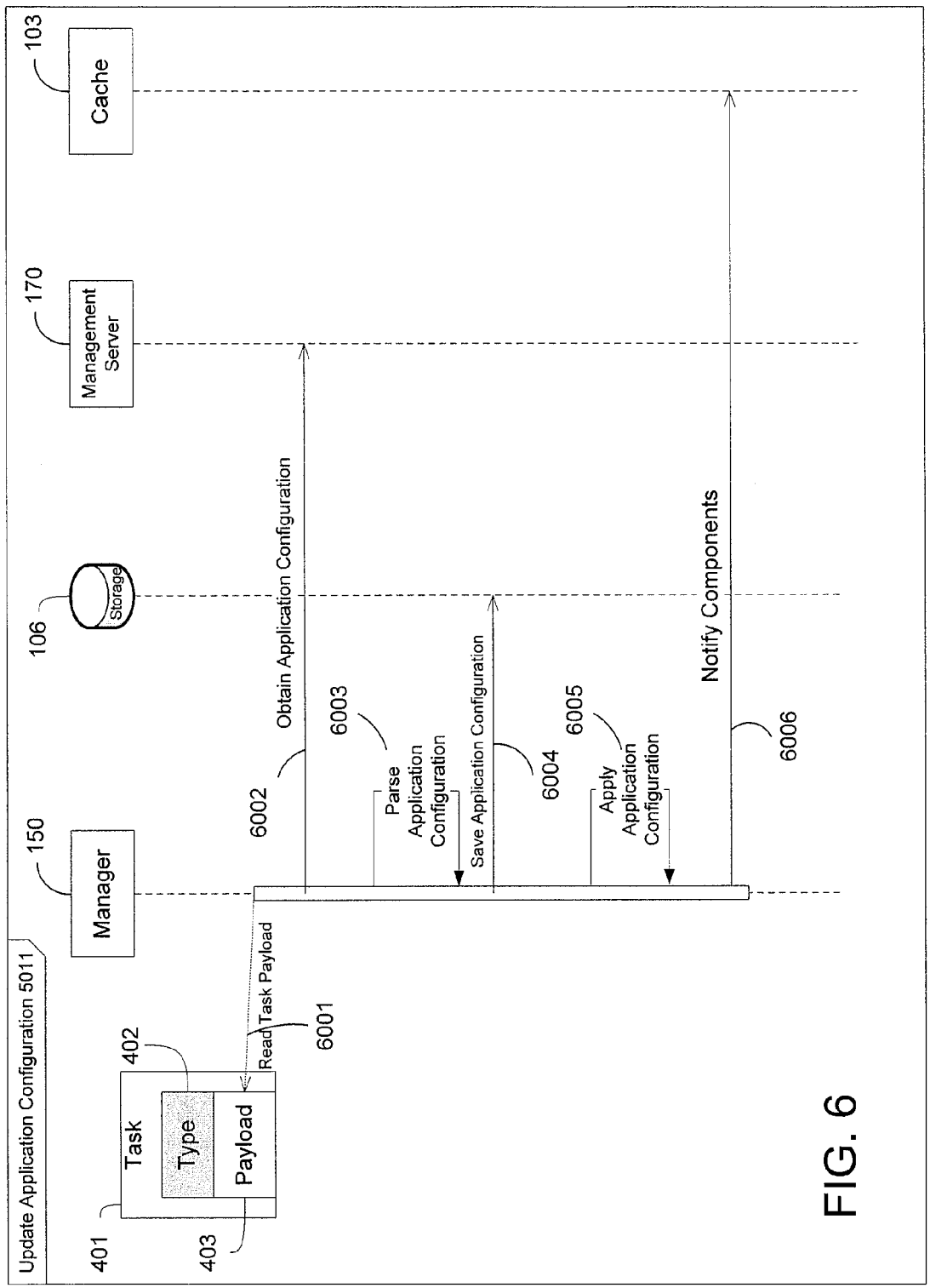
FIG. 6 is a UML sequence diagram showing an example UML frame Update Application Configuration for processing of application configuration data according to an embodiment.

FIG. 6 shows an exemplary processing of application configuration data, when the Manager 150 finds that the Payload 403 of the Update Settings Task 401 contains application configuration data, according to an embodiment of the present invention. First, the Manager 150 performs Read Task Payload 6001 to obtain the application configuration data, or it may indicate where to obtain it, such as from the Management Server 170 at step Obtain Application Configuration 6002. Then, the Manager 150 parses and checks the application configuration data at Parse Application Configuration 6003 to ensure it is valid, before saving the application configuration to Storage 106 at step Save Application Configuration 6004. The Manager 150 may now apply the new configuration at Apply Application Configuration 6005, which can include updating its runtime data structures, and notifying other components about the changes at Notify Components 6006, such as notifying the Cache 103.

Referring back to FIG. 5, if the Update Settings task payload indicates that site configuration data needs to be updated, then it is updated at step 5012. Site configuration data can specify the dedicated caches to create, and which host names or URL patterns that each cache will handle.

Figure 7:
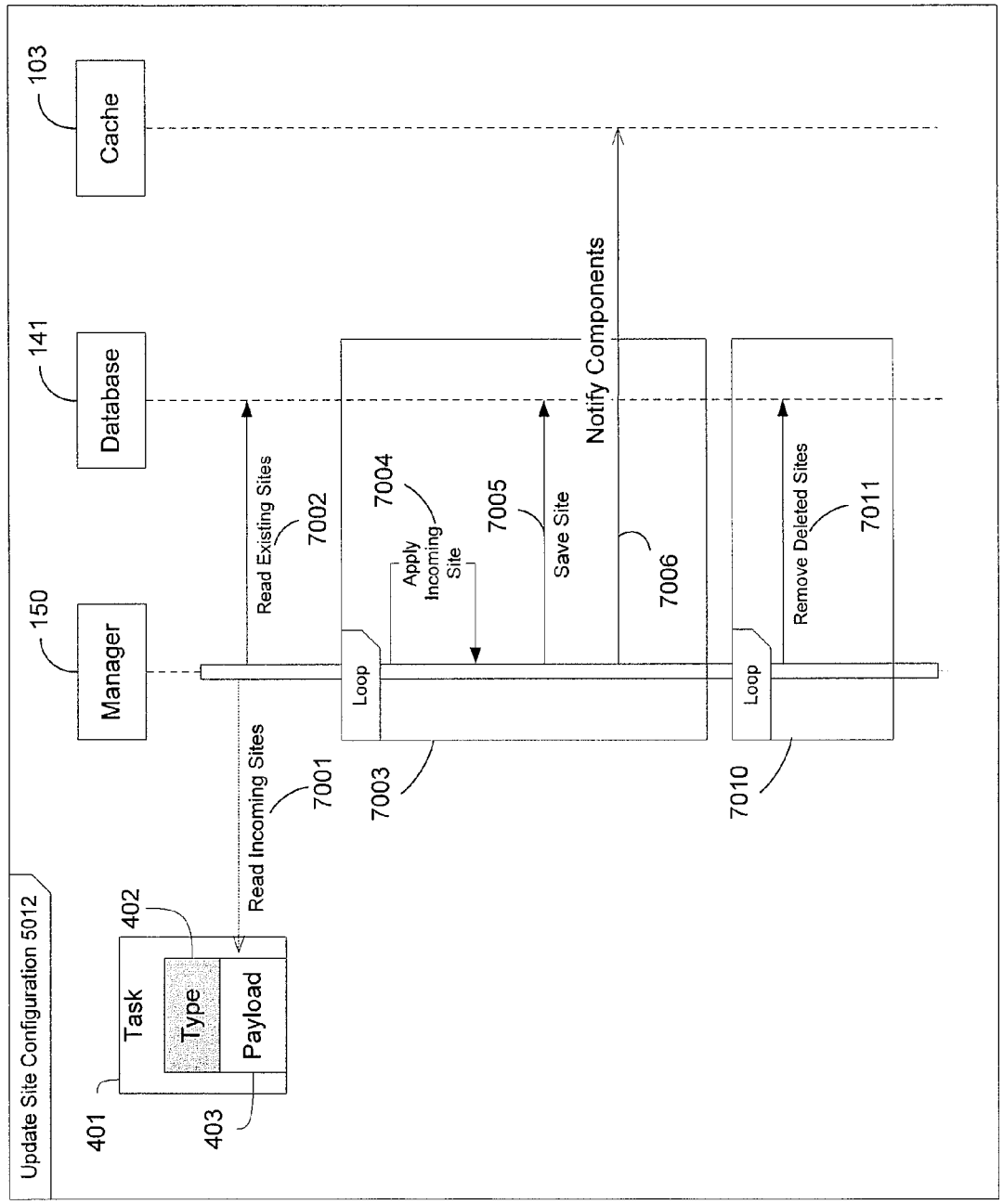
FIG. 7 is a UML sequence diagram showing an example UML frame Update Site Configuration for processing site configuration data according to an embodiment.

FIG. 7 shows an exemplary processing of site configuration data, when the Manager 150 finds that the Payload 403 of the Update Settings Task 401 contains site configuration data, according to an embodiment of the present invention. First, the Manager 150 performs Read Incoming Sites 7001 to obtain the sites from the new site configuration. Manager 150 then performs Read Existing Sites 7002 to obtain the current sites stored in Database 141 that need to be updated. Then, in Loop 7003, for each site in the incoming site configuration, the Manager 150 may perform Apply Incoming Site 7004, which may, for example, add a new site or update an existing site. The changes may then be saved to the Database 141 at Save Site 7005. The Manager may then perform Notify Components 7006, so that other components, such as the Cache 103, can apply respective changes. Next, in Loop 7010, Manager 150 looks for any sites that are no longer part of the site configuration, and removes them at Remove Deleted Sites 7011.

Referring back to FIG. 5, if the Update Settings task payload indicates that settings from a configuration template are available, then its settings are applied at Apply Configuration Template 5013. A configuration template contains settings that affect the operation of exemplary system embodiments of the invention, which are similar to application configuration data. These settings may differ from those in the application configuration data in that they are more dynamic in nature, such as settings that can be modified by the end user or administrator through a graphical user interface.

Figure 8:
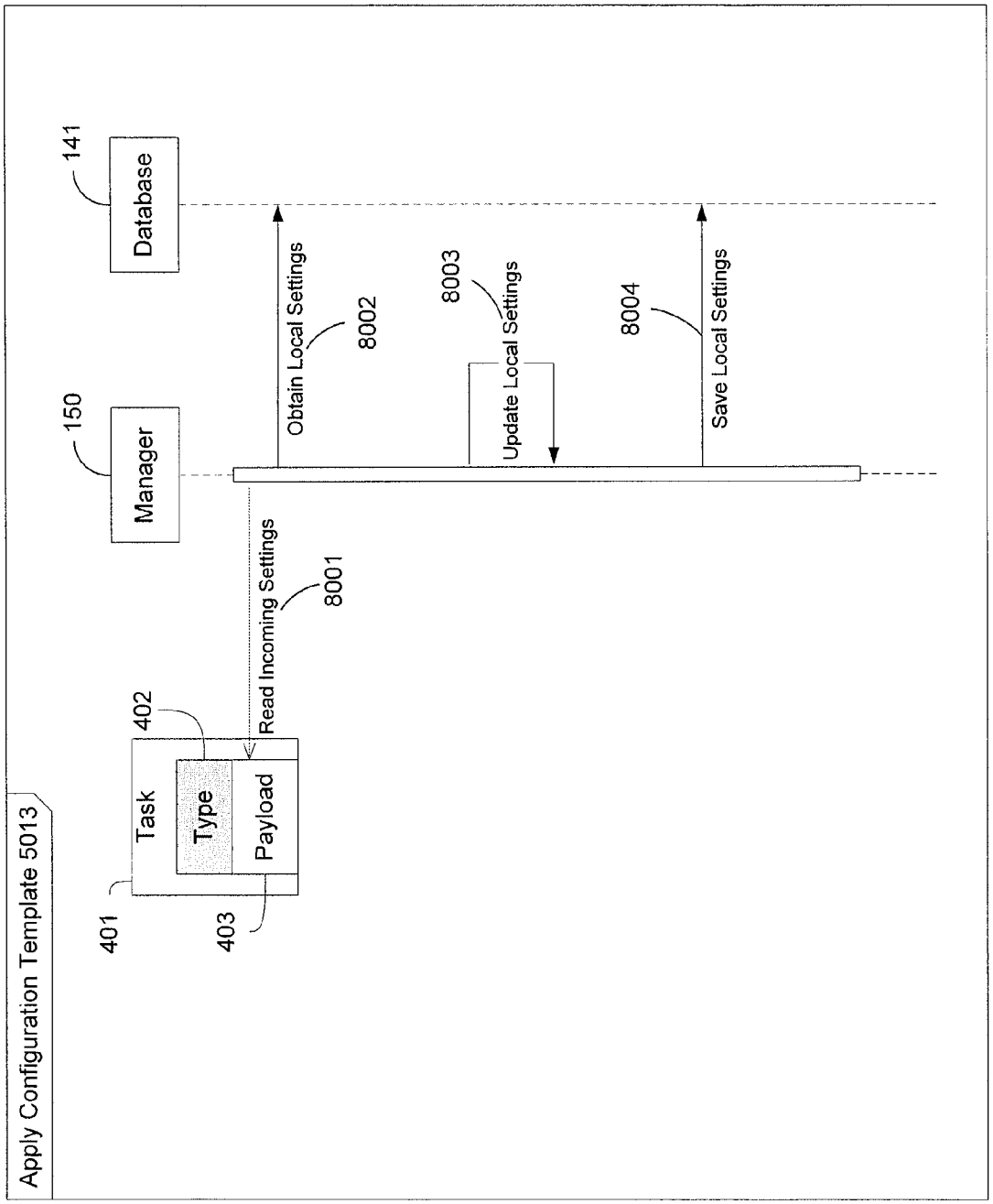
FIG. 8 is a UML sequence diagram showing an example UML frame Apply Configuration Template for processing of configuration template settings according to an embodiment.

FIG. 8 shows an exemplary processing of the configuration template settings, when the Manager 150 performs Read Incoming Settings 8001 to obtain the settings from the Payload 403, according to an embodiment of the present invention. The Manager 150 may perform Obtain Local Settings 8002 to obtain the current settings from the Database 141, then perform Update Local Settings 8003 based on the incoming settings, and then perform Save Local Settings 8004 to persist the local settings to the Database 141.

The results of the Update Settings subtasks are collected so that they can be sent to the Management Server 170 in step 4030.

3.2.2 Purge Cache Task

If the Manager 150 receives a task with the Task Type 402 set to "Purge Cache", then the Payload 403 specifies instructions for purging the caches at Client 100, as indicated at step 5014 in FIG. 5.

Figure 9:
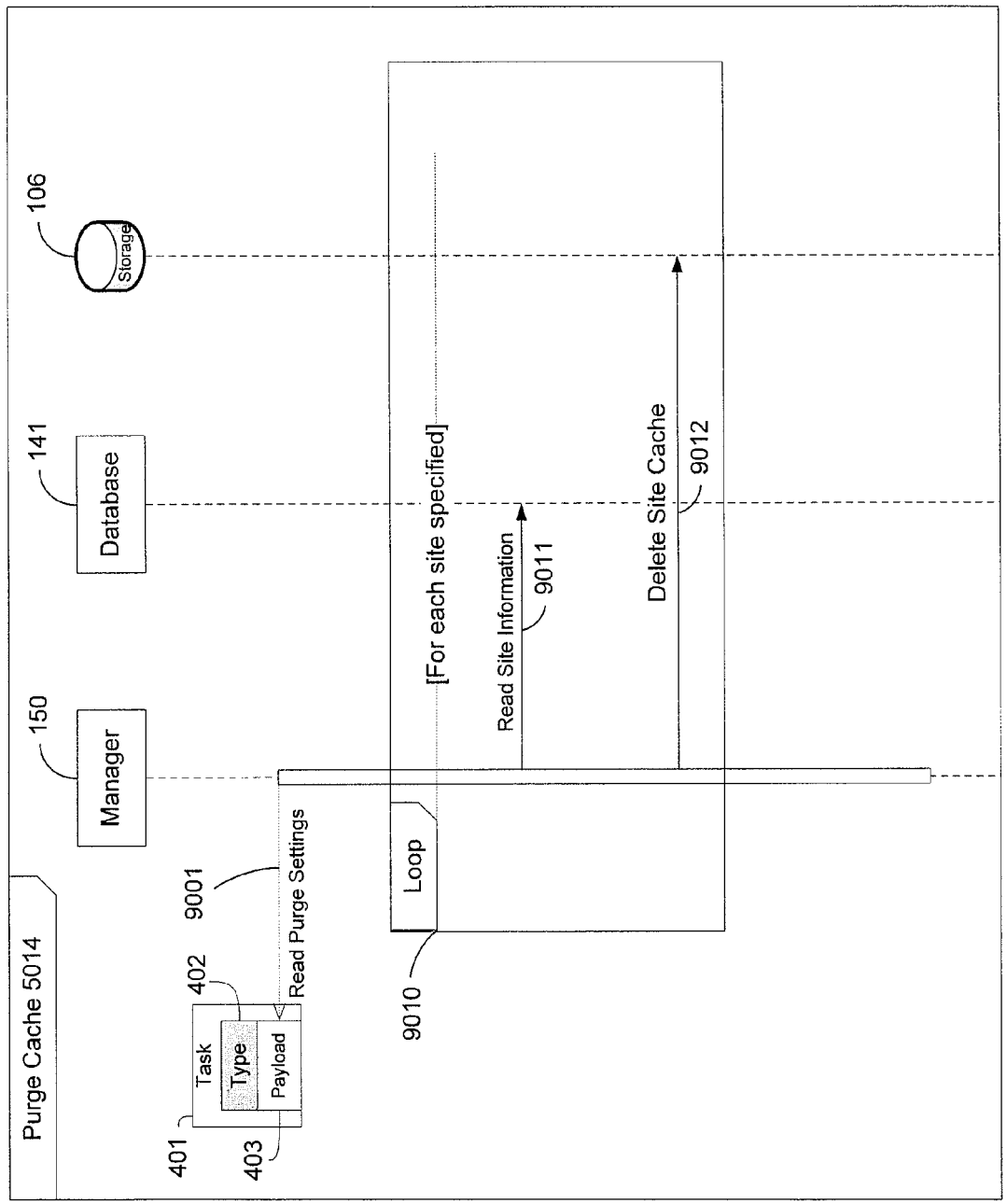
FIG. 9 is a UML sequence diagram showing an example UML frame Purge Caches for processing a purge caches task according to an embodiment.

FIG. 9 details an exemplary UML sequence for processing a Purge Cache 5014 task according to an embodiment of the present invention. Referring to FIG. 9, the Manager 150 performs Read Purge Settings 9001 from the Payload 403, which describes, for example, the caches to be purged, and the Manager 150 may purge each of the caches specified in Loop 9010. Each cache purge request may identify, for example, a site to purge, such as by hostname or URL pattern. The Manager 150 may perform Read Site Information 9011 to determine where that site's cache is stored in the Storage 106, so that the Manager 150 can then perform Delete Site Cache 9012.

The results of the Purge Cache task are collected so that they can be sent to the Management Server 170 in step 4030.

3.2.3 Flush Cache Items Task

If the Manager 150 receives a task with the Task Type 402 set to "Flush Cache Items", then the Payload 403 specifies instructions for deleting specific items from the caches at the Client 100, as indicated at step 5015 in FIG. 5.

Figure 10:
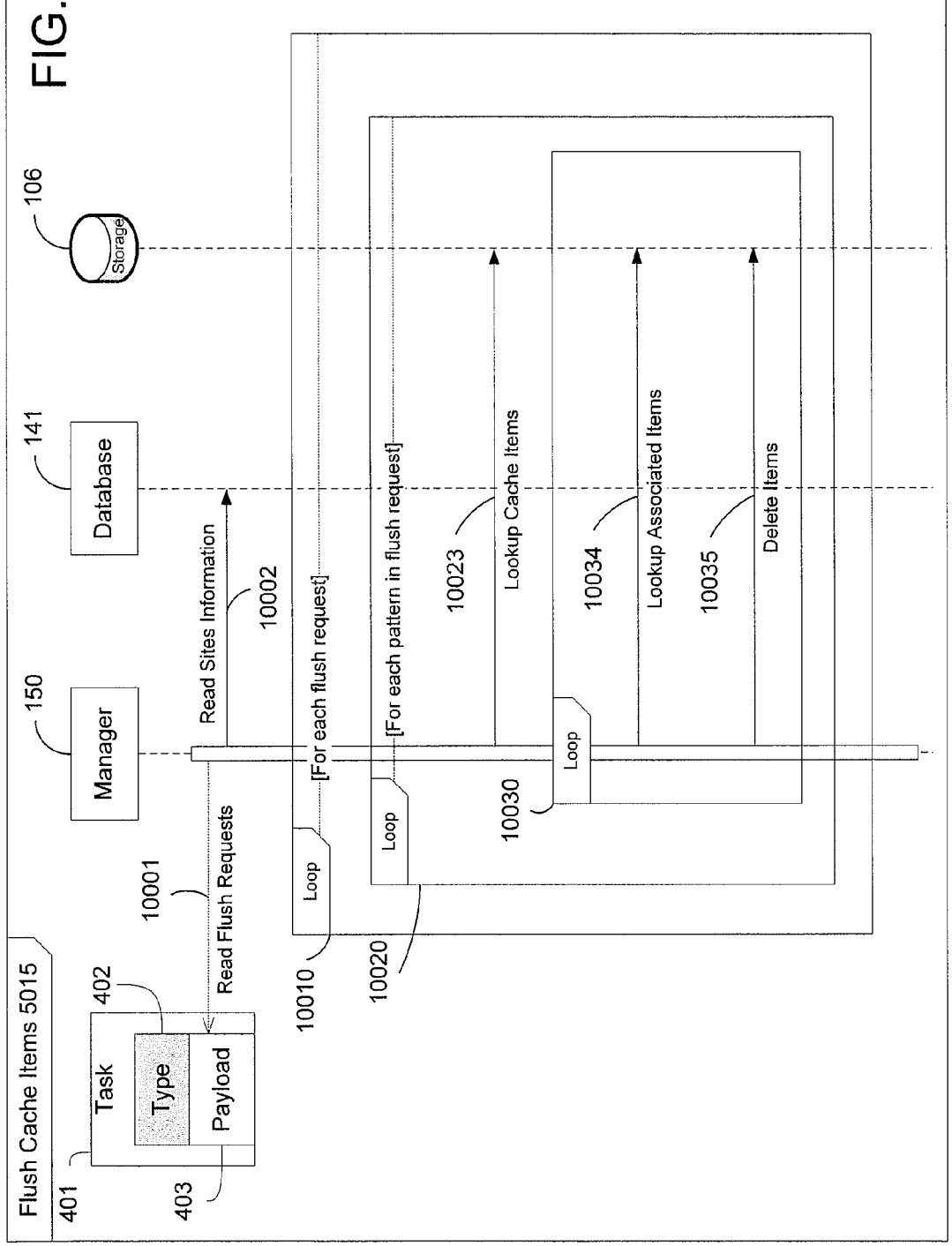
FIG. 10 is a UML sequence diagram showing an example UML frame Flush Cache Items for deleting specific items from the caches according to an embodiment.

FIG. 10 details an exemplary UML sequence for processing a Flush Cache Items 5015 task according to an embodiment of the present invention. Referring to FIG. 10, the Manager 150 performs Read Flush Requests 10001 from the Payload 403, which describes, for example, which cache items are to be deleted from the caches on Client 100. The Manager 150 may then perform Read Sites Information 10002 from the Database 141, to obtain information about each site's cache, such as their current contents.

Next, in Loop 10010 (the outer loop), for each flush request retrieved from the Payload 403, the flush request may describe the specific content or content types to flush from the cache, such as using regular expressions or URL patterns. In Loop 10020 (the middle loop), for each of these flush requests, the Manager 150 may perform Lookup Cache Items 10023 to locate items matching the flush request in the corresponding site cache stored on the Storage 106. In one exemplary embodiment, Cache items are stored in files that are named by a "lookup key" for fast lookup, such as using the hash of the cache item's URL, so locating these cache items may entail reading the corresponding metadata for these cache items to obtain and compare their actual URL.

Next, in Loop 10030 (the inner loop), for each of these cache items, the Manager 150 may also perform Lookup Associated Items 10034 to locate any content associated with these items, such as a mapping file that references a user-friendly name for the cache item or the corresponding HTTP response headers for this cache item. Then, in step 10035, the Manager 150 deletes all of the items from the Storage 106 that it found for the cache item matching the flush request.

The results of the Flush Cache Items task are collected so that they can be sent to the Management Server 170 in step 4030.

3.3 Exemplary Method

Figure 11:
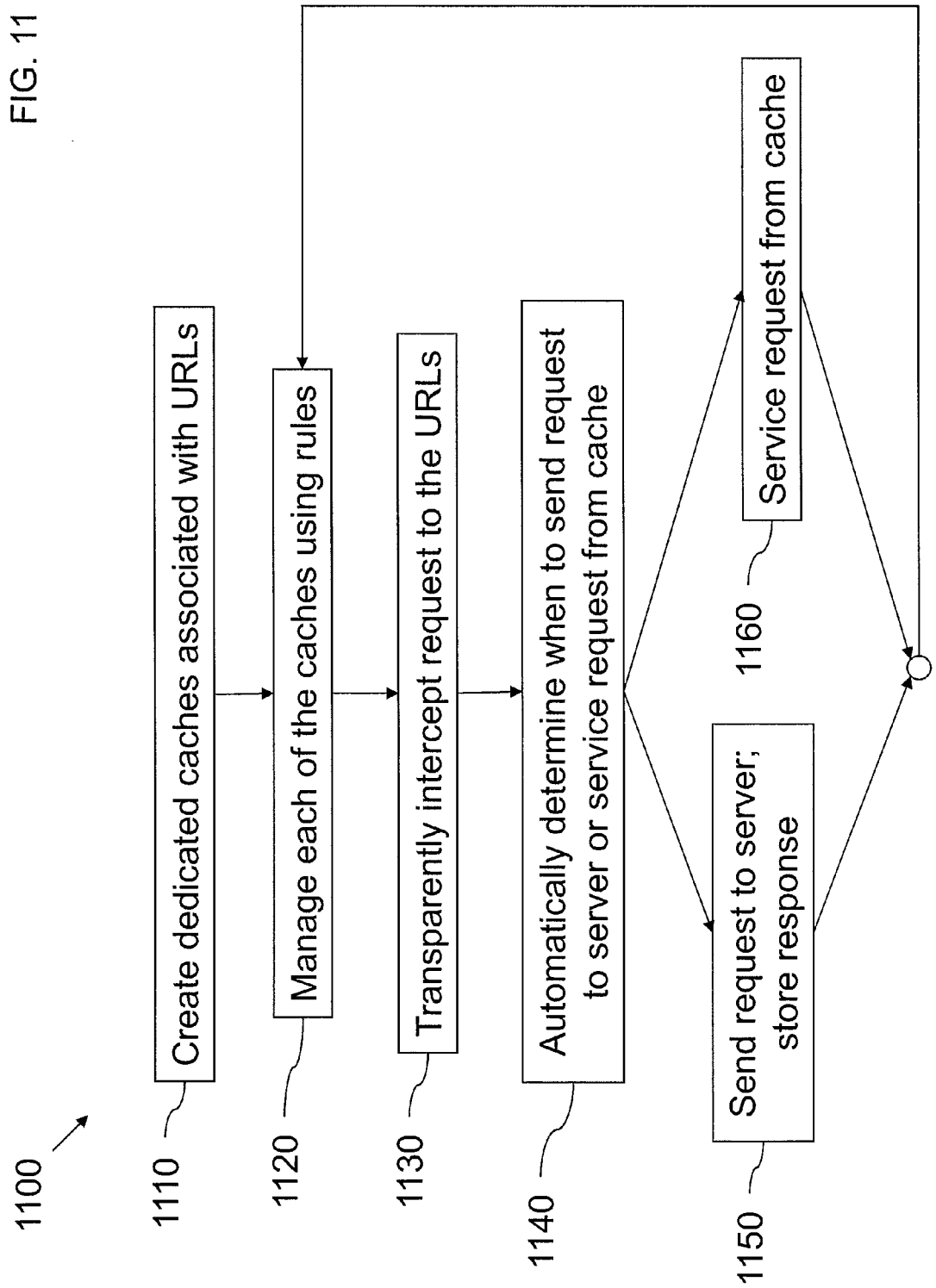
FIG. 11 illustrates an exemplary method of dedicated cache management according to an embodiment of the present invention.

FIG. 11 illustrates an exemplary method 1100 of dedicated cache management according to an embodiment of the present invention. The method 1100 is for configuring a computer to communicate with a remote server through a network and to provide access to content or services provided by the server.

Processing begins, and in step 1110, one or more dedicated caches are created, each cache being associated with one or more URLs. Each of the caches is then managed in step 1120 using one or more rules. A request to the URLs is transparently intercepted in step 1130 from a client application to the server. The cache automatically determines in step 1140 when to send the request to and provide a response from the server over the network to appear to the client application as though the client application sent the request to and received the response from the server. The cache does this by either (1) sending the request to the server in step 1150 to appear to the server as though the client application sent the request, providing the response from the server, and storing the response on the storage device, or (2) providing the response in step 1160 from one of the caches. Processing then repeats with step 1120, managing the caches and intercepting and servicing requests.

4 Conclusion

It is noteworthy that although the foregoing examples have been shown with respect to specific Internet applications and protocols, the present invention is not limited to these Internet applications or protocols. Other current and future Internet applications or protocols can use the foregoing adaptive aspects.

Although the present invention has been described with reference to specific embodiments, these embodiments are illustrative only and not limiting. Many other applications and embodiments of the present invention will be apparent in light of this disclosure, the following claims, and equivalents thereof.

What is claimed is:

1. A client-based computer system configured to communicate with a remote server through a network and to provide access to static content provided by the server, the system comprising: a processor; a storage device; a client-side cache dedicated to a first subset of the static content as specified by a configuration, the client-side cache being directed by the configuration: to transparently intercept a request for a member of the first subset from a client application to the server; and to automatically determine when to send the request to and provide a response from the server over the network to appear to the client application as though the client application sent the request to and received the response from the server, by: sending the request to the server to appear to the server as though the client application sent the request, providing the response from the server, and storing the response on the storage device; or providing the response from the cache; and a caching manager to automatically retrieve the configuration from a remote system and to automatically create or remove application-specific caches as directed by the configuration, the configuration comprising one or more settings, each setting of the one or more settings comprising: a matching attribute specifying which portion of the static content provided by the server to manage by the cache in accordance with the setting; and an action attribute specifying caching actions or behaviors to apply to the specified portion of the static content associated with the setting, wherein the configuration comprises: a first section for directing the caching manager; a second section for directing the cache; and a mapping rule specifying a mapping of the request to the client-side dedicated cache associated with a specific one of a plurality of application types and a mapping of the request to a specific response within the client-side dedicated cache.

2. The system of claim 1, wherein the cache or the caching manager is configured to automatically apply any updates to the configuration.

3. The system of claim 1, wherein the system is configured to receive the configuration from a management console.

4. The system of claim 3, further comprising the management console.

5. The system of claim 4, wherein the cache or the caching manager is configured to automatically apply any updates to the configuration whenever the configuration is changed at the management console.

6. The system of claim 4, wherein the management console is configured to assign the configuration based upon a unique configuration identifier.

7. The system of claim 6, wherein the management console is further configured to assign a unique client identifier to the system when the system initially registers with the management console.

8. The system of claim 3, wherein the caching manager is configured to respond to a command provided by the management console.

9. The system of claim 8, wherein the command is to update the configuration.

10. The system of claim 8, wherein the command is to delete content in the cache.

11. The system of claim 10, wherein the command is to delete content in the cache that corresponds to a URL pattern.

12. The system of claim 8, wherein the command is to refresh content in the cache.

13. The system of claim 1, wherein the request comprises an HTTP request.

14. The system of claim 13, wherein the request comprises a POST request.

15. The system of claim 1, wherein the configuration specifies when to store the response on the storage device or when to provide the response from the cache based on a set of rules.

16. The system of claim 15, wherein the rules comprise URL patterns to determine when to store the response on the storage device or when to provide the response from the cache.

17. The system of claim 15, wherein the rules specify how long a stored response is to be retained in the cache.

18. The system of claim 15, wherein the rules specify how long a stored response can be used to supply the response without revalidation from the server.

19. The system of claim 15, wherein the mapping rules comprise filtering out a portion of the request.

20. The system of claim 1, wherein the configuration associates different rules for different application types.

21. The system of claim 1, wherein the configuration associates a user account on the remote server to which the cache is dedicated.

22. The system of claim 1 wherein the cache or the caching manager is configured to automatically refresh contents of the cache.

23. The system of claim 22, wherein the contents of the cache are configured to be automatically refreshed according to a schedule.

24. The system of claim 1, wherein the cache comprises a plurality of dedicated caches.

25. The system of claim 24, wherein the configuration specifies a corresponding plurality of application types to which respective ones of the caches are dedicated.

26. The system of claim 24, wherein the configuration specifies a corresponding plurality of user accounts to which respective ones of the caches are dedicated.

27. The system of claim 24, wherein the caching manager is further configured to reconfigure the dedicated caches on the storage device as directed by the configuration.

28. The system of claim 27, wherein the caching manager is further configured to reconfigure storage space of each of the dedicated caches on the storage device as directed by the configuration.

29. A method for configuring a computer to communicate with a remote server through a network and to provide access to static content provided by the server, the method comprising: retrieving, by the computer, a configuration from a remote system, the configuration comprising one or more settings, each setting of the one or more settings comprising: a matching attribute specifying which portion of the static content provided by the server to manage by one of one or more dedicated application-specific caches in accordance with the setting; and an action attribute specifying caching actions or behaviors to apply to the specified portion of the static content associated with the setting; creating, by the computer as directed by the configuration, the one or more dedicated application-specific caches, each of the caches being associated with one or more URLs as specified by the matching attribute of a corresponding one of the settings; managing, by the computer as directed by the configuration, each of the caches according to one or more rules specified in the action attribute of the corresponding one of the settings of the configuration; transparently intercepting, by the computer, a request for one of the URLs associated with one of the caches from a client application to the server; and automatically determining, by the computer, when to send the request to and provide a response from the server over the network to appear to the client application as though the client application sent the request to and received the response from the server, comprising: sending the request to the server to appear to the server as though the client application sent the request, providing the response from the server, and storing the response on a storage device; or providing the response from the one of the caches, wherein the configuration comprises: a first section for directing the caching manager; a second section for directing the cache; and a mapping rule specifying a mapping of the request to a client-side dedicated cache of the one or more dedicated application-specific caches, the client-side dedicated cache being associated with a specific one of a plurality of application types and a mapping of the request to a specific response within the client-side dedicated cache.

30. The method of claim 29, further comprising reconfiguring, by the computer as directed by the configuration, the one or more caches.

31. The method of claim 29, further comprising reconfiguring, by the computer as directed by the configuration, the URLs associated with each of the caches.

32. The method of claim 29, further comprising using, by the computer as directed by the configuration, URL patterns to determine when to store the response on the storage device or when to provide the response from the one of the caches.

33. The method of claim 29, further comprising using, by the computer as directed by the configuration, a rule to decide how long a stored response is to be retained in a corresponding one of the caches.

34. The method of claim 29, further comprising using, by the computer as directed by the configuration, a rule to decide how long a stored response can be used to supply the response without revalidation from the server based on a specified value.

35. The method of claim 29, further comprising responding, by the computer as directed by the configuration, to a command to delete content in a specified one of the caches.

36. The method of claim 29, further comprising responding, by the computer as directed by the configuration, to a command to delete content in a specified one of the caches that corresponds to a URL pattern.

37. The method of claim 29, further comprising responding, by the computer as directed by the configuration, to a command to refresh content in a specified one of the caches.

* * * * *